United States Patent
Nedungadi et al.

(10) Patent No.: US 11,895,012 B2
(45) Date of Patent: Feb. 6, 2024

(54) METHODS AND SYSTEMS FOR SWITCH MANAGEMENT

(71) Applicant: Nile Global, Inc., San Jose, CA (US)

(72) Inventors: Promode Nedungadi, San Jose, CA (US); Suresh Katukam, Milpitas, CA (US); Avoy Nanda, Dublin, CA (US)

(73) Assignee: NILE GLOBAL, INC., San Jose, CA (US)

(*) Notice: Subject to any disclaimer, the term of this patent is extended or adjusted under 35 U.S.C. 154(b) by 98 days.

(21) Appl. No.: 17/589,793

(22) Filed: Jan. 31, 2022

(65) Prior Publication Data

US 2023/0246948 A1    Aug. 3, 2023

(51) Int. Cl.
  *H04L 45/00* (2022.01)
  *H04L 45/12* (2022.01)
  *H04L 43/0823* (2022.01)
  *H04L 45/02* (2022.01)

(52) U.S. Cl.
  CPC .......... *H04L 45/22* (2013.01); *H04L 43/0823* (2013.01); *H04L 45/04* (2013.01); *H04L 45/12* (2013.01)

(58) Field of Classification Search
  None
  See application file for complete search history.

(56) References Cited

U.S. PATENT DOCUMENTS

| | | | |
|---|---|---|---|
| 4,858,232 A * | 8/1989 | Diaz | H04J 3/0626 370/465 |
| 6,785,272 B1 | 8/2004 | Sugihara | |
| 8,654,680 B2 | 2/2014 | Subramanian et al. | |
| 9,038,151 B1 | 5/2015 | Chua et al. | |
| 9,294,350 B2 | 3/2016 | Agarwal et al. | |
| 10,103,980 B1 * | 10/2018 | Tiwari | H04L 45/66 |
| 2006/0104199 A1 | 5/2006 | Katukam et al. | |
| 2006/0140118 A1 * | 6/2006 | Alicherry | H04J 3/1617 370/235 |
| 2007/0086364 A1 | 4/2007 | Ellis et al. | |
| 2011/0110309 A1 | 5/2011 | Bennett | |
| 2014/0365622 A1 * | 12/2014 | Iyengar | H04L 41/0893 709/220 |
| 2019/0158939 A1 | 5/2019 | Frankel et al. | |
| 2019/0230034 A1 * | 7/2019 | Indiresan | H04L 45/74 |
| 2019/0363989 A1 * | 11/2019 | Shalev | H04L 43/0852 |
| 2020/0213215 A1 * | 7/2020 | Jayadevappa | H04L 63/08 |
| 2020/0366625 A1 * | 11/2020 | Ballard | H04L 45/245 |
| 2022/0210116 A1 * | 6/2022 | Katukam | H04L 61/4511 |

OTHER PUBLICATIONS

International Search Report and Written Opinion for PCT/US2023/011911 dated Apr. 12, 2023, 14 pgs.

* cited by examiner

*Primary Examiner* — Xavier S Wong
(74) *Attorney, Agent, or Firm* — Loza & Loza, LLP

(57) ABSTRACT

Embodiments of a device and method are disclosed. In an embodiment, a method for switch management involves connecting switches to form a switch ring, and within the switch ring, configuring each of the switches to participate equally in network communications.

17 Claims, 9 Drawing Sheets

Form an access switch (AS) ring using ASs of the enterprise campus network, where the ASs of the AS ring are of different types or models, where the ASs of the AS ring are connected to at least one distribution switch (DS), and where each of the ASs of the AS ring is connected to at least one wireless access point (AP) — 902

Within the AS ring, configure each of the ASs to participate equally in network communications of the enterprise campus network — 904

Automatically detect a failure within the AS ring based on a routing protocol executed by the ASs of the AS ring — 906

In response to the failure, provide at least one alternative routing path within the AS ring — 908

METHODS AND SYSTEMS FOR SWITCH MANAGEMENT

BACKGROUND

Growing adoption of enterprise campus networks allows enterprises to increase network coverage and functionality. For example, due to the dynamic nature of the business and campuses, capabilities to grow the access layer where end users, access points (APs), client devices, such as, laptops, printers, servers, security cameras, and/or other connected Internet of things (IoT) devices connect are important to the successful deployment of an enterprise campus network. In addition, because switches are built with a finite number of ports and an enterprise campus network typically supports multiple floors in a building with need for a large number of ports, multiple switches may need to be connected in an enterprise campus network. Typically, switch stacking technology (e.g., StackWise or HiGig2) in which multiple switches are bound together is done at Layer 2 (the data link layer of the Open Systems Interconnection (OSI) model). However, performing switch stacking in Layer 2 usually requires special stacking protocols and may cause traffic flooding in learning stages. Therefore, there is a need for switch management technology that can efficiently support growth of an enterprise campus network (e.g., addition of switches) seamlessly.

SUMMARY

Embodiments of a device and method are disclosed. In an embodiment, a method for switch management involves connecting switches to form a switch ring, and within the switch ring, configuring each of the switches to participate equally in network communications. For example, within the switch ring, each switch performs Layer 3 (network layer) routing equally without specialized stacking protocols. Consequently, special roles, such as master switch and standby switches, are eliminated in the switch ring, and all the switches in the switch ring are equal in function and participate in the routing protocol exchange of information as required by at least one corresponding Layer 3 routing protocol (e.g., Open Shortest Path First (OSPF), Border Gateway Protocol (BGP), and/or Intermediate System to Intermediate System (IS-IS) protocol, etc.) used in the switch ring. Other embodiments are also described.

In an embodiment, the method further includes independently managing each of the switches of the switch ring using a cloud server.

In an embodiment, within the switch ring, configuring each of the switches to participate equally in the network communications includes within the switch ring, configuring each of the switches to participate equally in network routing.

In an embodiment, the method further includes automatically detecting a failure within the switch ring based on a routing protocol executed by the switches of the switch ring and in response to the failure, providing at least one alternative routing path within the switch ring.

In an embodiment, forming the switch ring using the switches includes connecting network ports of the switches that are capable of handling data traffic of at least one network layer protocol to each other.

In an embodiment, at least one network layer protocol includes an Internal Gateway Protocol (IGP), a Border Gateway Protocol (BGP), or an Intermediate System to Intermediate System (IS-IS) protocol.

In an embodiment, the at least one network layer protocol includes an Open Shortest Path First (OSPF) protocol.

In an embodiment, the switches of the switch ring include access switches (ASs).

In an embodiment, the access switches (ASs) are connected to at least one distribution switch (DS).

In an embodiment, the method further includes adding a switch to the switch ring without service disruption.

In an embodiment, the method further includes remove a switch from the switch ring without service disruption.

In an embodiment, the switches of the switch ring are of different types or models.

In an embodiment, the method further includes updating firmware of a switch of the switch ring without rebooting of other switches of the switch ring.

In an embodiment, each of the switches of the switch ring is connected to at least one wireless access point (AP).

In an embodiment, a method for switch management in an enterprise campus network involves forming a switch ring using switches of the enterprise campus network, within the switch ring, configuring each of the switches to participate equally in network communications of the enterprise campus network, and independently managing each of the switches of the switch ring using a cloud server of the enterprise campus network.

In an embodiment, within the switch ring, configuring each of the switches to participate equally in the network communications includes within the switch ring, configuring each of the switches to participate equally in network routing of the enterprise campus network.

In an embodiment, the method further includes automatically detecting a failure within the switch ring based on a routing protocol executed by the switches of the switch ring, and in response to the failure, providing at least one alternative routing path within the switch ring.

In an embodiment, forming the switch ring using the switches of the enterprise campus network includes connecting network ports of the switches that are capable of handling data traffic of at least one network layer protocol to each other.

In an embodiment, the at least one network layer protocol includes an Internal Gateway Protocol (IGP), a Border Gateway Protocol (BGP), or an Intermediate System to Intermediate System (IS-IS) protocol.

In an embodiment, a method for switch management in an enterprise campus network involves forming an access switch (AS) ring using ASs of the enterprise campus network, within the AS ring, configuring each of the ASs to participate equally in network routing of the enterprise campus network, automatically detecting a failure within the AS ring based on a routing protocol executed by the ASs of the AS ring, and in response to the failure, providing at least one alternative routing path within the AS ring. The ASs of the AS ring are of different types or models. The ASs of the AS ring are connected to at least one distribution switch (DS). Each of the ASs of the AS ring is connected to at least one wireless access point (AP)

Other aspects in accordance with the invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Figure 1:
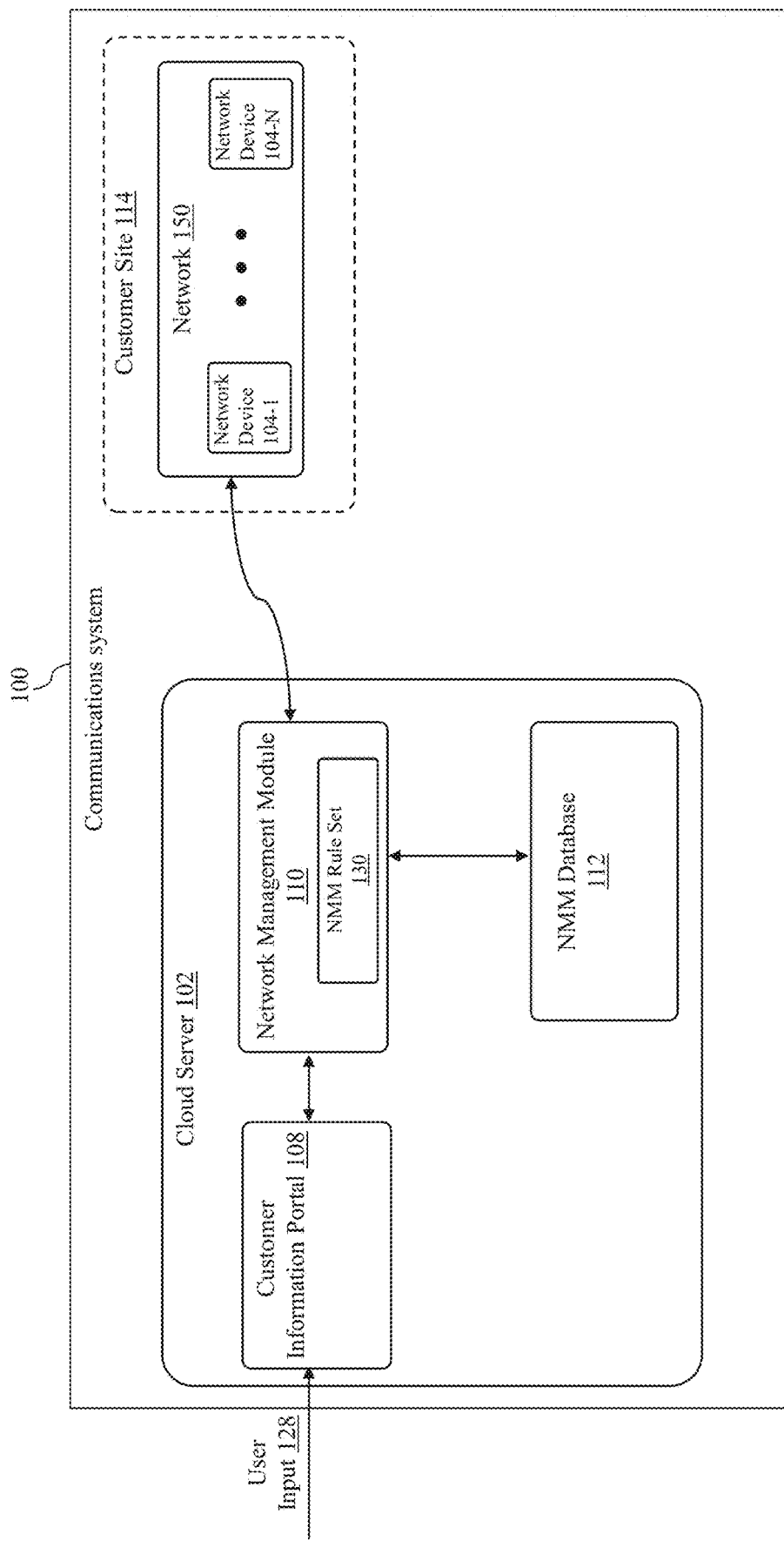
FIG. 1 depicts a communications system in accordance to an embodiment of the invention.

FIG. 1 depicts a communications system 100 in accordance to an embodiment of the invention. In the embodiment depicted in FIG. 1, the communications system includes a cloud server 102 and at least one deployed network 150 within a customer site 114. The cloud server and/or the deployed network may be implemented in hardware (e.g., circuits), software, firmware, or a combination thereof. Although the illustrated communications system 100 is shown with certain components and described with certain functionality herein, other embodiments of the communications system may include fewer or more components to implement the same, less, or more functionality. For example, in some embodiments, the communications system includes more than one cloud server, more than one deployed network, and/or more than one customer site. In another example, although the cloud server and the deployed network are shown in FIG. 1 as being connected in certain topology, the network topology of the communications system 100 is not limited to the topology shown in FIG. 1.

The cloud server 102 can be used to provide at least one service to a customer site (e.g., to the deployed network 150 located at the customer site 114). The cloud server may be configured to facilitate or perform a network management service (e.g., an authentication service) to network devices (e.g., the deployed network 150) at the customer site. Because the cloud server can facilitate or perform a network management service or operation for network devices at the customer site, network management efficiency can be improved. In addition, because the cloud server can facilitate or perform a network management service or operation for network devices at the customer site, a user or customer of the customer site can be notified of a device and/or network outage. Consequently, device and/or network outage time can be reduced. In some embodiments, the cloud server is configured to generate a user interface to obtain input information, for example, a floor plan of a customer site. In some embodiments, the user interface includes a graphical user interface. The cloud server may be implemented in hardware (e.g., circuits), software, firmware, or a combination thereof. In some embodiments, the cloud server is hosted or executed in a public cloud computing environment such as Amazon Web Services (AWS), and/or a private cloud computing environment such as an enterprise cloud server. In some embodiments, the cloud server is implemented on a server grade hardware platform, such as an x86 architecture platform. For example, the hardware platform of the cloud server may include conventional components of a computing device, such as one or more processors (e.g., central processing units (CPUs)), system memory, a network interface, storage system, and other Input/Output (I/O) devices such as, for example, a mouse and a keyboard (not shown). In some embodiments, the processor is configured to execute instructions such as, for example, executable instructions that may be used to perform one or more operations described herein and may be stored in the memory and the storage system. In some embodiments, the memory is volatile memory used for retrieving programs and processing data. The memory may include, for example, one or more random access memory (RAM) modules. In some embodiments, the network interface is configured to enable the cloud server to communicate with another device via a communication medium. The network interface may be one or more network adapters, also referred to as a Network Interface Card (NIC). In some embodiments, the cloud server includes local storage devices (e.g., one or more hard disks, flash memory modules, solid state disks and optical disks) and/or a storage interface that enables the host to communicate with one or more network data storage systems, which are used to store information, such as executable instructions, cryptographic keys, virtual disks, configurations, and other data.

In the embodiment depicted in FIG. 1, the cloud server 102 includes a network management module (NMM) 110, a customer information portal 108 connected to the NMM module 110, and an NMM database 112 configured to store NMM data. The NMM module, the customer information portal, and/or the NMM database may be implemented in hardware (e.g., circuits), software, firmware, or a combination thereof. Although the illustrated cloud server is shown with certain components and described with certain functionality herein, other embodiments of the cloud server may include fewer or more components to implement the same, less, or more functionality. For example, in some embodiments, the cloud server includes more than one NMM module, more than one customer information portal, and/or more than one NMM database. In another example, although the NMM module, the customer information portal, and the NMM database are shown in FIG. 1 as being connected in a certain topology, the network topology of the cloud server is not limited to the topology shown in FIG. 1. In addition, although the customer information portal 108 is shown in FIG. 1 as being a component of the cloud server 102, in other embodiments, the customer information portal may be implemented outside of the cloud server. In some embodiments, the NMM module 110 is configured to facilitate or perform an NMM service (e.g., an authentication service) to network devices (e.g., the deployed network 150) at the customer site 114, for example, using an NMM rule set 130. The NMM rule set 130 may include one or more NMM rules (e.g., authentication rules) for network devices at the customer site 114, for example, for performing an NMM service (e.g., an authentication service) to network devices at the customer site 114. In some embodiments, the NMM module 110 is configured to generate and/or transmit at least one alert (e.g., a device outage alert or a network throughput alert) regarding a network deployed and/or to be deployed at the customer site or a network operator site, for example, to an administrator or a user or customer (e.g., a layperson such as a worker on-site or an end-user such as an employee) at the customer site 114. In some embodiments, the NMM database 112 is configured to store NMM data for a network deployed and/or to be deployed at the customer site (e.g., a list of network devices deployed or to be deployed at the customer site). In some embodiments, the NMM database 112 is configured to store the at least one NMM alert. Because the NMM module can facilitate or perform network diagnostic for network devices at the customer site, network diagnostic efficiency can be improved. In addition, because the NMM deployment module can facilitate or perform a network management service or operation for network devices at the customer site, an administrator or a customer can be notified of device and/or network conditions or outages. Consequently, device and/or network outage or low performance time can be shortened. The customer information portal 108 is configured to receive user input 128. In some embodiments, the customer information portal is configured to include or generate a user interface that allows a customer to input information related to the customer site 114 (e.g., the floor plan of the customer site 114) and/or information associated with an NMM service for the customer site 114, such as one or more specific requirements or restrictions.

In the communications system 100 depicted in FIG. 1, the customer site 114 may include one or more buildings, and each building may include one or more floors. Network devices that can be deployed at the customer site may include any type of suitable network devices. For example, network devices may be designated to be deployed to a specific building, a specific floor within a building, and/or a specific location on a floor of a building. A network device that can be deployed at the customer site may be fully or partially implemented as an Integrated Circuit (IC) device. In the embodiment depicted in FIG. 1, the network 150 includes one or more network devices 104-1, . . . , 104-N, where N is a positive integer. In some embodiments, at least one of the one or more network devices 104-1, . . . , 104-N is a wired and/or wireless communications device that includes at least one processor (e.g., a microcontroller, a digital signal processor (DSP), and/or a CPU), at least one wired or wireless communications transceiver implemented in one or more logical circuits and/or one or more analog circuits, at least one wired or wireless communications interface and that supports at least one wired or wireless communications protocol, and/or at least one antenna. For example, at least one of the one or more network devices 104-1, . . . , 104-N is compatible with Institute of Electrical and Electronics Engineers (IEEE) 802.3 protocol and/or one or more wireless local area network (WLAN) communications protocols, such as IEEE 802.11 protocol, and/or a short-range communications protocol, such as Bluetooth. In some embodiments, at least one of the one or more network devices 104-1, . . . , 104-N is a wired communications device that is compatible with at least one wired local area network (LAN) communications protocol, such as a wired router (e.g., an Ethernet router), a wired switch, a wired hub, or a wired bridge device (e.g., an Ethernet bridge). In some embodiments, at least one of the one or more network devices 104-1, . . . , 104-N is a wireless access point (AP) that connects to a local area network (e.g., a LAN) and/or to a backbone network (e.g., the Internet) through a wired connection and that wirelessly connects to wireless stations (STAs), for example, through one or more WLAN communications protocols, such as an IEEE 802.11 protocol. In some embodiments, the network 150 includes at least one distribution switch (DS) or distribution layer switch that functions as a bridge between a core layer switch and an access layer switch, at least one head end (HE) or gateway, at least one access switch (AS) that can directly interact with a lower-level device (e.g., a wireless AP), at least one wireless AP, and/or at least one wireless sensor that wirelessly connects to a wireless AP. In some embodiments, at least one of the one or more network devices 104-1, . . . , 104-N is a wireless station (STA) that wirelessly connects to a wireless AP. For example, at least one of the one or more network devices 104-1, . . . , 104-N may be a laptop, a desktop personal computer (PC), a mobile phone, or other wireless device that supports at least one WLAN communications protocol (e.g., an IEEE 802.11 protocol)).

Figure 2:
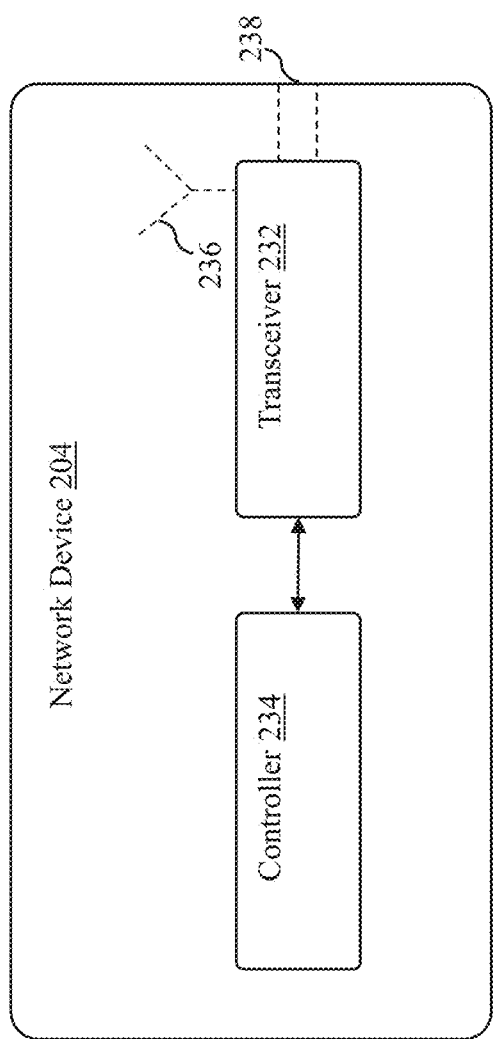
FIG. 2 depicts an embodiment of a network device of the communications system depicted in FIG. 1.

FIG. 2 depicts an embodiment of a network device 204 of the communications system 100 depicted in FIG. 1. The network device 204 may be an embodiment of a network device that is included in the deployed network 150 in FIG. 1. However, network devices that can be included in the deployed network 150 depicted in FIG. 1 are not limited to the embodiment depicted in FIG. 2. The network device 204 may be any suitable type of network device. For example, the network device 204 may be a distribution switch, a gateway, an access switch, a wireless access point, or a sensor. In the embodiment depicted in FIG. 2, a network device 204 includes at least one wireless and/or wired transceiver 232, at least one antenna 236 operably connected to the transceiver 232-1, at least one optional network port 238 operably connected to the transceiver 232, and a controller 234 operably connected to the transceiver 232. In some embodiments, the transceiver 232 includes a physical layer (PHY) device. The transceivers 232 may be any suitable type of transceiver. For example, the transceiver 232 may be a short-range communications transceiver (e.g., a Bluetooth or Bluetooth Low Energy (BLE) transceiver) or a WLAN transceiver (e.g., a transceiver compatible with an IEEE 802.11 protocol). In some embodiments, the network device 204 includes multiple transceivers, for example, a short-range communications transceiver (e.g., a Bluetooth or BLE transceiver) and a WLAN transceiver (e.g., a transceiver compatible with an IEEE 802.11 protocol). For example, the network device 204 includes a WLAN transceiver (e.g., a transceiver compatible with an IEEE 802.11 protocol) and a short-range communications transceiver (e.g., a Bluetooth or BLE transceiver). In some embodiments, the network device (e.g., a wireless AP) includes multiple antennas and multiple wireless transceivers that share the antennas. In some embodiments, the controller 234 is configured to control the transceiver 232 to process packets received through the antenna 236 and/or the network port 238 and/or to generate outgoing packets to be transmitted through the antenna 236 and/or the network port 238. In some embodiments, the controller 234 is configured to obtain and/or store network information relevant to the network device 204. For example, the controller 234 may be configured to obtain and/or store network information (e.g., routing information such as a routing table) relevant to the network device 204. The antenna 236 may be any suitable type of antenna. For example, the antenna 236 may be an induction type antenna such as a loop antenna or any other suitable type of induction type antenna. However, the antenna 236 is not limited to an induction type antenna. The network port 238 may be any suitable type of port. For example, the network port 238 may be a local area network (LAN) network port such as an Ethernet port. However, the network port 238 is not limited to LAN network ports.

Figure 3:
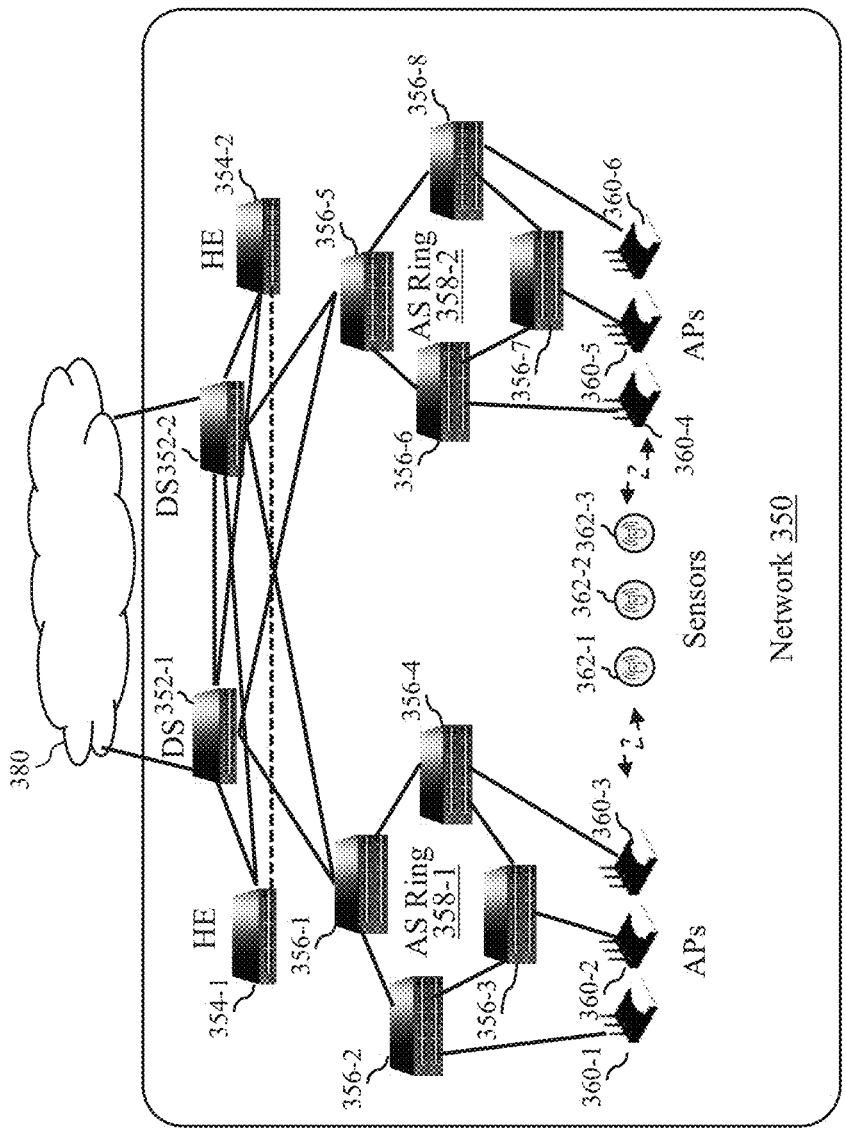
FIG. 3 depicts a network that can be included in the communications system depicted in FIG. 1.

FIG. 3 depicts a network 350 that can be included in the communications system 100 depicted in FIG. 1. The network 350 depicted in FIG. 3 is an embodiment of the network 150 depicted in FIG. 1. However, the network 150 depicted in FIG. 1 is not limited to the embodiment depicted in FIG. 3. In the embodiment depicted in FIG. 3, the network 350 includes a pair of distribution switches (DSs) or distribution layer switches 352-1, 352-2 that are aggregation switches functioning as a bridge between core layer switches and access layer switches, a pair of head ends (HEs) or gateways 354-1, 354-2, a number of access switches (ASs) 356-1, 356-2, 356-3, 356-4, 356-5, 356-6, 356-7, 356-8 connected in rings 358-1, 358-2 that directly interact with lower level devices (e.g., wireless APs), a number of wireless APs 360-1, 360-2, 360-3, 360-4, 360-5, 360-6 connected to the ASs, and a number of wireless sensors 362-1, 362-2, 362-3 that wirelessly connect to the wireless APs. The DSs 352-1, 352-2 are connected to a network 380 (e.g., the Internet), which is connected to a network management module (e.g., the network management module 110 of the cloud server 102 depicted in FIG. 1). In some embodiments, the network 350 constitutes a network service block (NSB), which is a basic building block for providing connectivity as a service and is a replicable block that can be scaled (e.g., expanded) to meet any deployment. Although the network 350 is shown with certain components and described with certain functionality herein, other embodiments of the network 350 may include fewer or more components to implement the same, less, or more functionality. For example, in some embodiments, the network 350 includes only one DS, more than two DSs, no HE, only one HE, more than two HEs, less than eight ASs, more than eight ASs, less than six wireless APs, more than six wireless APs, less than three wireless sensors, and/or more than three wireless sensors. In another example, the network 350 includes one or more wired and/or wireless devices, for example, laptops, desktop personal computers (PCs), mobile phones, and/or cameras. In another example, although the network 350 shown in FIG. 3 as being connected in certain topology, the network topology of the network 350 is not limited to the topology shown in FIG. 3. In some embodiments, the number of HEs and DSs is constant in the network 350 while the number of the wireless APs, the ASs and the sensor(s) in the network 350 varies.

In a traditional switch stacking approach, switches (e.g., access switches (ASs)) are stacked up and connected together in a daisy chain using special purpose dedicated stacking ports. Typically, switches (e.g., ASs) go through a complex master election process whereby one (or two in case redundancy is supported) switch is designated as the master switch for a switch stack. Within a switch stack, all other switches are managed via the master switch and network protocols, such as, Spanning Tree Protocol (STP), run on the master switch, which manages traffic appropriately. Consequently, a single point of failure in a master switch can cause a networking failure for an entire stack of switches. If redundancy is supported in a switch stack, a standby switch is needed to take over when a master switch fails. In a traditional switch stack, proprietary protocols are commonly used to perform the binding and designation of a master switch. Traditional switch stacks tend to experience disruptions while adding or removing switches from the switch stack and typically require a carefully managed complex process via master switches. In addition, upgrading firmware on any switch in a switch stack normally requires a reboot of all the switches in the switch stack and replacement switches have to be of the same model type. In an embodiment in accordance with the invention, specialized stacking protocols, dedicated stacking ports, and master switch-based switch stack management is avoided by flattening the hierarchy and removing the need for a master (or a standby switch for redundancy) and creating a "ring of equals" with respect to running network protocols and with respect to capability of forwarding network traffic to the appropriate destination. Because of the active model with a "ring of equals," the need for master election and related special routing techniques and protocols are avoided. In these embodiments, access layer switches (e.g., ASs) can be connected using any network port capable of handling data traffic of Layer 3 (the network layer of the OSI model) routing protocols, such as, Internal Gateway Protocol (IGP) (e.g., Open Shortest Path First (OSPF)), Border Gateway Protocol (BGP), and/or Intermediate System to Intermediate System (IS-IS) protocols). Each switch (e.g., each AS) can be independently and/or directly managed by one or more network management entities (e.g., the network management module 110 of the cloud server 102 depicted in FIG. 1). Switches in a ring can be managed by the cloud server 102 depicted in FIG. 1 as independent units. Since access layer switches (e.g., ASs) in a switch ring participate equally in the network protocol and routing, there is no single or double points of failure. For example, within the switch ring, each switch performs Layer 3 (network layer) routing equally without specialized stacking protocols. Consequently, special roles, such as master switch and standby switches, are eliminated in the switch ring, and all the switches in the switch ring are equal in function and participate in the routing protocol exchange of information as required by at least one corresponding Layer 3 routing protocol (e.g., OSPF, BGP, and/or IS-IS protocol, etc.) used in the switch ring. Failure of switches are automatically addressed by a routing protocol, which detects a switch failure and provides one or more alternate paths around the switch ring. A switch (e.g., an AS) in a switch ring may have a peer-to-peer relationship with other switches (e.g., ASs) in the switch ring. A switch (e.g., an AS) in a switch ring may perform the same or similar functions in the network protocol and routing as other switches (e.g., ASs) in the switch ring. A switch (e.g., an AS) in a switch ring may act as the same role in the network protocol and routing as other switches (e.g., ASs) in the switch ring. A switch ring does not differentiate between master switches and non-master switches. Consequently, specialized protocols and techniques to elect a master switch can be avoided, which improves the reliability and maintainability of the access layer by avoiding running multiple protocols, reducing software overhead and chances for related failures and reducing the need for specialized knowledge to troubleshoot and resolve the related failures. In addition, the need for stack topology learning by traffic flooding, which is prone to network congestion, resource exhaustion, and related failures, is reduced. Adding more network elements (e.g., switches) to a switch stack is simplified because a new switch can be connected to the ring using any network port capable of handling data traffic of Layer 3 routing protocols. A switch ring can be expanded or shrunk without impact to overall performance of the ring with Layer 3 routing automatically handling link/switch failures. While inserting a new switch, a switch ring automatically routes around a breakage point and when the new switch is connected, the new switch boots up and participates in the routing protocol and automatically becomes a member of the access ring. Consequently, switches can be added or removed to expand or shrink a switch ring without service disruption without requiring switches to be of the same model/type. In addition, upgrading firmware on one or more switches does not require disruption and/or reboot of the other switches.

Consequently, reliability of a campus access layer is significantly improved by avoiding the need for certain Layer 2 protocols and flooding of traffic in the access switch stack and removing any single point of failure. In addition, the operations and maintenance of campus access networks are improved by removing special protocols, techniques for master/standby election and related software code. Operators do not need to have specialized knowledge of esoteric stacking protocols. In addition, network maintenance and operations are simplified by avoiding the need for switches to be of the same model and avoiding disruption when upgrading. Network switches and cabling operations are also simplified by using standard switch ports as opposed to using special stack ports and stacking cables as is the case in traditional Layer 2 switch stacking technology.

Figure 4:
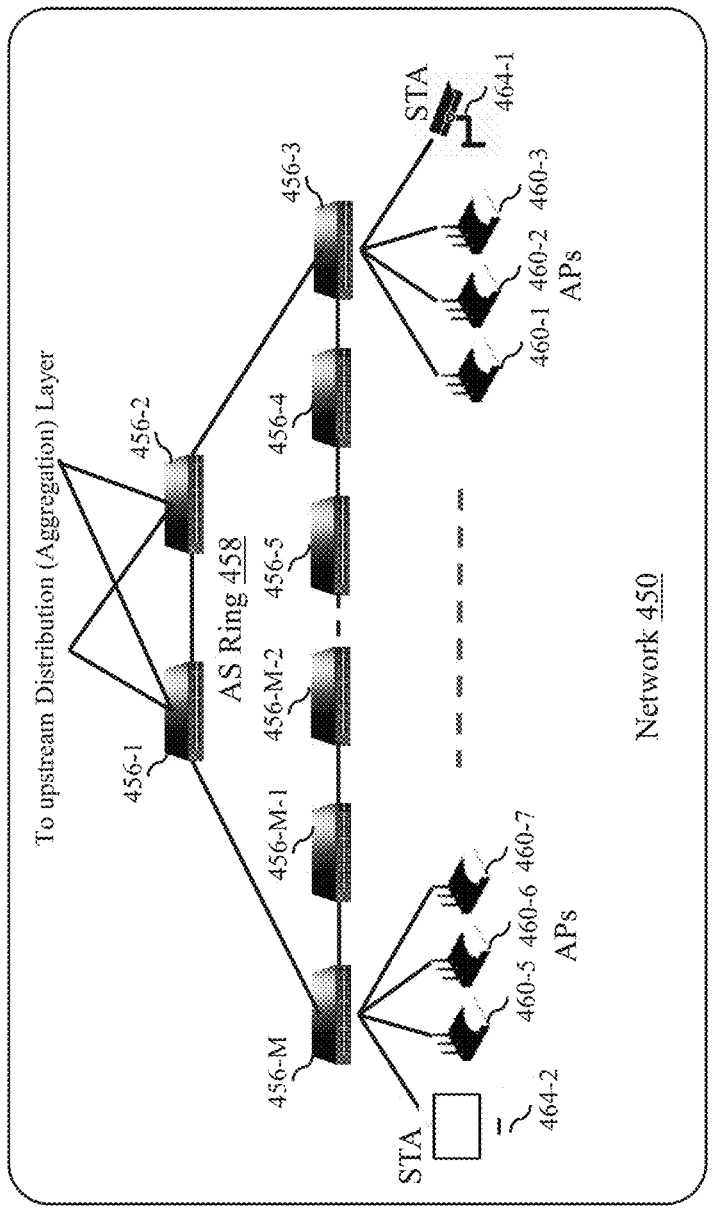
FIG. 4 depicts a network that can be included in the communications system depicted in FIG. 1.

FIG. 4 depicts a network 450 that can be included in the communications system 100 depicted in FIG. 1. The network 450 depicted in FIG. 4 is an embodiment of the network 150 depicted in FIG. 1. However, the network 150 depicted in FIG. 1 is not limited to the embodiment depicted in FIG. 4. In the embodiment depicted in FIG. 4, the network 450 includes an access switch (AS) ring 458 that includes a number of ASs 456-1, 456-2, 456-4, 456-5, . . . , 456-M-2, 456-M-1, 456-M (where M is an integer greater than seven) connected in rings, a number of wireless APs 460-1, 460-2, 460-3, 460-4, 460-5, 460-6 connected to the ASs, and a number of STAs 464-1, 464-2 (e.g., one or more computer or one or more camera). The AS ring 458 is connected to upstream distribution (aggregation) layer (e.g., distribution switches (DS), such as, the DSs 352-1, 352-2 depicted in FIG. 3), which is connected to a network management module (e.g., the network management module 110 of the cloud server 102 depicted in FIG. 1). Although the network 450 is shown with certain components and described with certain functionality herein, other embodiments of the network 450 may include fewer or more components to implement the same, less, or more functionality. For example, in some embodiments, the network 450 include different number of ASs, different number of wireless APs, and/or different number of STAs. In another example, each of the ASs 456-1, 456-2, 456-4, 456-5, . . . , 456-M-2, 456-M-1, 456-M is directly connected to at least one wireless AP and/or at least one STA. In another example, although the network 450 shown in FIG. 4 as being connected in certain topology, the network topology of the network 450 is not limited to the topology shown in FIG. 4.

Figure 5:
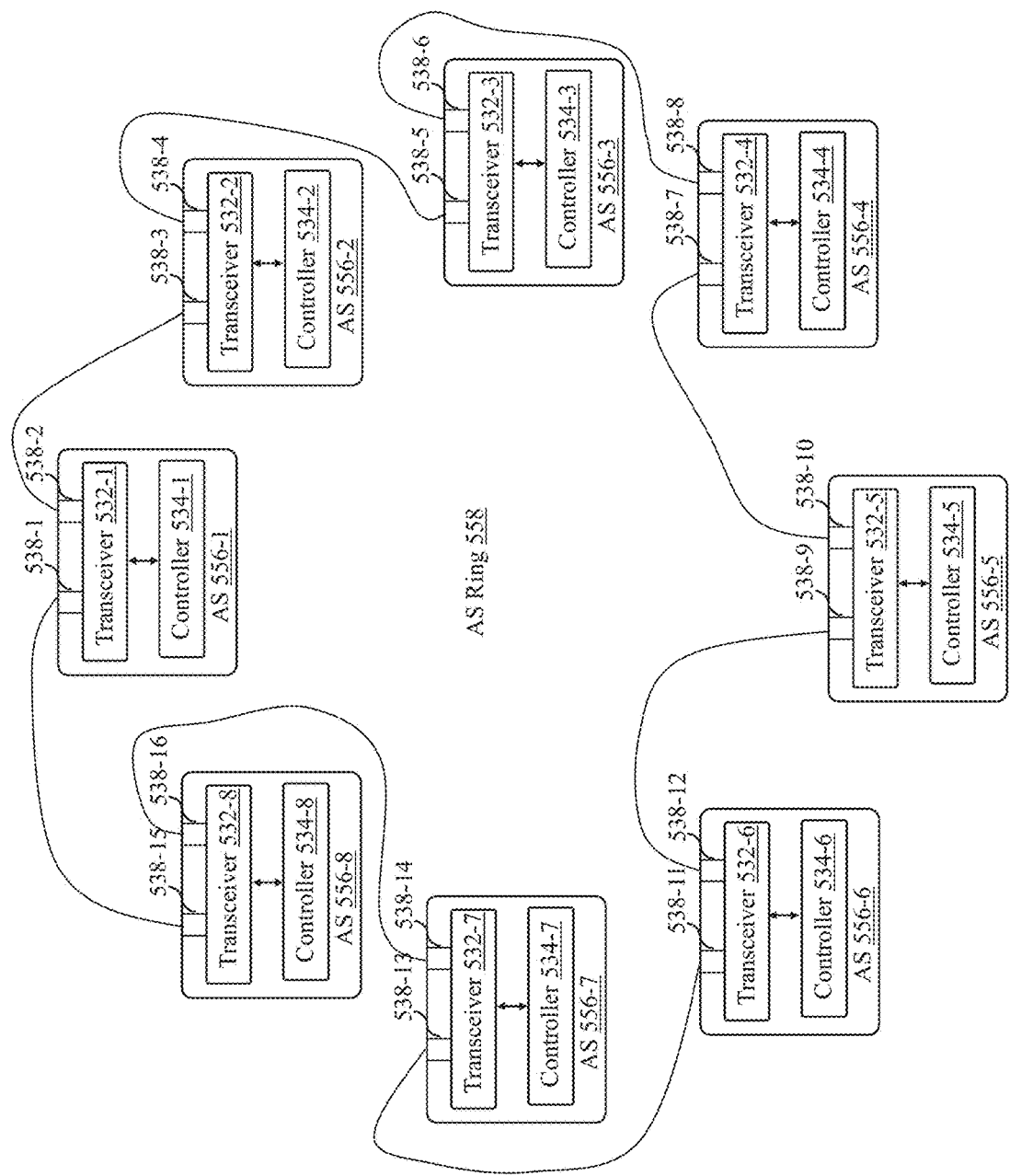
FIG. 5 depicts an embodiment of an access switch (AS) ring of the network depicted in FIG. 4.

FIG. 5 depicts an embodiment of the AS ring 458 of the network 450 depicted in FIG. 4. An AS ring 558 depicted in FIG. 5 is an embodiment of the AS ring 458 depicted in FIG. 4. However, the AS ring 458 depicted in FIG. 4 is not limited to the embodiment depicted in FIG. 5. In the embodiment depicted in FIG. 5, the AS ring 558 includes eight ASs 556-1, 556-2, 556-3, 556-4, 556-5, 556-6, 556-7, 556-8. Although the AS ring 558 is shown with certain components and described with certain functionality herein, other embodiments of the AS ring 558 may include fewer or more components to implement the same, less, or more functionality. For example, the AS ring 558 may include more than eight ASs or less than eight ASs.

In the embodiment depicted in FIG. 5, each of the ASs 556-1, 556-2, 556-3, 556-4, 556-5, 556-6, 556-7, 556-8 includes at least one wireless and/or wired transceiver 532-1, 532-2, 532-3, 532-4, 532-5, 532-6, 532-7, or 532-8, at least two network ports 538-1 and 538-2, 538-3 and 538-4, 538-5 and 538-6, 538-7 and 538-8, 538-9 and 538-10, 538-11 and 538-12, 538-13 and 538-14, and 538-15 and 538-16 operably connected to the transceiver 532-1, 532-2, 532-3, 532-4, 532-5, 532-6, 532-7, or 532-8, and a controller 534-1, 534-2, 534-3, 534-4, 534-5, 534-6, 534-7, or 534-8 operably connected to the transceiver 532-1, 532-2, 532-3, 532-4, 532-5, 532-6, 532-7, or 532-8. Each of the ASs 556-1, 556-2, 556-3, 556-4, 556-5, 556-6, 556-7, 556-8 may include one or more additional network ports for connections to one or more wireless APs or one or more STAs, etc. In some embodiments, the transceiver 532-1, 532-2, 532-3, 532-4, 532-5, 532-6, 532-7, or 532-8 includes a physical layer (PHY) device. The transceiver 532-1, 532-2, 532-3, 532-4, 532-5, 532-6, 532-7, or 532-8 may be any suitable type of transceiver. For example, the transceiver 532-1, 532-2, 532-3, 532-4, 532-5, 532-6, 532-7, or 532-8 may be a local area network (LAN) (e.g., Ethernet) transceiver. In some embodiments, the AS 556-1, 556-2, 556-3, 556-4, 556-5, 556-6, 556-7, or 556-8 includes multiple transceivers. The network ports 538-1, 538-2, 538-3, 538-4, 538-5, 538-6, 538-7, 538-8, 538-9, 538-10, 538-11, 538-12, 538-13, 538-14, 538-15, 538-16 may be any suitable type of ports. For example, the network ports 538-1, 538-2, 538-3, 538-4, 538-5, 538-6, 538-7, 538-8, 538-9, 538-10, 538-11, 538-12, 538-13, 538-14, 538-15, 538-16 may be LAN network ports such as Ethernet ports. However, the network ports 538-1, 538-2, 538-3, 538-4, 538-5, 538-6, 538-7, 538-8, 538-9, 538-10, 538-11, 538-12, 538-13, 538-14, 538-15, 538-162 are not limited to LAN network ports. In some embodiments, the AS 556-1, 556-2, 556-3, 556-4, 556-5, 556-6, 556-7, or 556-8 includes one or more antennas. In some embodiments, the controller 534-1, 534-2, 534-3, 534-4, 534-5, 534-6, 534-7, or 534-8 is configured to control the transceiver 532-1, 532-2, 532-3, 532-4, 532-5, 532-6, 532-7, or 532-8 to process packets received through the network ports 538-1 and 538-2, 538-3 and 538-4, 538-5 and 538-6, 538-7 and 538-8, 538-9 and 538-10, 538-11 and 538-12, 538-13 and 538-14, and 538-15 and 538-16, respectively, and/or to generate outgoing packets to be transmitted through the network ports 538-1 and 538-2, 538-3 and 538-4, 538-5 and 538-6, 538-7 and 538-8, 538-9 and 538-10, 538-11 and 538-12, 538-13 and 538-14, and 538-15 and 538-16, respectively2. In some embodiments, the controller 534-1, 534-2, 534-3, 534-4, 534-5, 534-6, 534-7, or 534-8 is configured to obtain and/or store network information relevant to the AS 556-1, 556-2, 556-3, 556-4, 556-5, 556-6, 556-7, or 556-8. For example, the controller 534-1, 534-2, 534-3, 534-4, 534-5, 534-6, 534-7, or 534-8 may be configured to obtain and/or store network information (e.g., routing information such as a routing table) relevant to the AS 556-1. In some embodiments, the controller 534-1, 534-2, 534-3, 534-4, 534-5, 534-6, 534-7, or 534-8 executes one or more Layer 3 (L3) protocols, for example, an Internal Gateway Protocol (IGP) (e.g., an Open Shortest Path First (OSPF) protocol), a Border Gateway Protocol (BGP), or an Intermediate System to Intermediate System (IS-IS) protocol. The controller 534-1, 534-2, 534-3, 534-4, 534-5, 534-6, 534-7, or 534-8 may include a processor (e.g., a microcontroller, a DSP, and/or a CPU) configured to execute one or more Layer 3 (L3) protocols, and memory that may store information (e.g., an operation system (OS)) for the processor.

The ASs 556-1, 556-2, 556-3, 556-4, 556-5, 556-6, 556-7, 556-8 form the AS ring 558. Within the AS ring 558, each AS 556-1, 556-2, 556-3, 556-4, 556-5, 556-6, 556-7, or 556-8 (e.g., the controller 534-1, 534-2, 534-3, 534-4, 534-5, 534-6, 534-7, or 534-8) is configured to participate equally in network communications (e.g., network routing). For example, within the AS ring 558, each AS performs Layer 3 (network layer) routing equally without specialized stacking protocols. Consequently, special roles, such as master switch and standby switches, are eliminated in the AS ring 558, and all the ASs in the AS ring 558 are equal in function and participate in the routing protocol exchange of information as required by at least one corresponding Layer 3 routing protocol (e.g., OSPF, BGP, IS-IS, etc.) used in the AS ring 558. Each AS in the AS ring 558 may have a peer-to-peer relationship with other ASs in the AS ring 558. Each AS in the AS ring 558 may perform the same or similar functions in the network protocol and routing as other ASs in the AS ring 558. Each AS in the AS ring 558 may act as the same role in the network protocol and routing as other ASs in the AS ring 558. The AS ring 558 does not differentiate between master ASs and non-master ASs. Each AS 556-1, 556-2, 556-3, 556-4, 556-5, 556-6, 556-7, or 556-8 can be independently managed using a cloud server (e.g., the cloud server 102 depicted in FIG. 1). A failure within the AS ring 558 can be automatically detected based on a routing protocol executed by the ASs 556-1, 556-2, 556-3, 556-4, 556-5, 556-6, 556-7, 556-8 (e.g., the controllers 534-1, 534-2, 534-3, 534-4, 534-5, 534-6, 534-7, 534-8) of the AS ring 558. In response to the failure, at least one alternative routing path can be provided within the AS ring 558, for example, by the ASs 556-1, 556-2, 556-3, 556-4, 556-5, 556-6, 556-7, 556-8 (e.g., the controllers 534-1, 534-2, 534-3, 534-4, 534-5, 534-6, 534-7, 534-8). Consequently, specialized protocols and techniques to elect a master switch can be avoided, which improves the reliability and maintainability of the access layer by avoiding running multiple protocols, reducing software overhead and chances for related failures and specialized knowledge to troubleshoot and resolve the related failures. In addition, the need for stack learning by traffic flooding, which is prone to network congestion, resource exhaustion, and related failures, is reduced. In the embodiment depicted in FIG. 5, the network ports (e.g., Ethernet ports) 538-1, 538-2, 538-3, 538-4, 538-5, 538-6, 538-7, 538-8, 538-9, 538-10, 538-11, 538-12, 538-13, 538-14, 538-15, 538-16 of the ASs 556-1, 556-2, 556-3, 556-4, 556-5, 556-6, 556-7, 556-8 of the AS ring 558, which are capable of handling data traffic of at least one network layer protocol (e.g., an Internal Gateway Protocol (IGP) (e.g., an Open Shortest Path First (OSPF) protocol), a Border Gateway Protocol (BGP), or an Intermediate System to Intermediate System (IS-IS) protocol) are connected to each other. Network Switches and cabling operations are simplified by using standard switch ports as opposed to using special stack ports and stacking cables in traditional Layer 2 switch stacking technology. An AS can be added to the AS ring 558 and/or removed from the AS ring 558 without service disruption. While inserting a new AS, the AS ring 558 can automatically route around a breakage point and when the new AS is connected, the AS boots up and participates in the routing protocol and automatically becomes a member of the AS ring 558. Consequently, ASs can be added or removed to expand or shrink the AS ring 558 without service disruption and does not require switches to be of the same model/type. Firmware of an AS 556-1, 556-2, 556-3, 556-4, 556-5, 556-6, 556-7, or 556-8 of the AS ring 558 may be updated, for example, using a cloud server (e.g., the cloud server 102 depicted in FIG. 1) and the controller 534-1, 534-2, 534-3, 534-4, 534-5, 534-6, 534-7, or 534-8, without rebooting of other switches of the AS ring 558. The ASs 556-1, 556-2, 556-3, 556-4, 556-5, 556-6, 556-7, 556-8 of the AS ring 558 may be of different types or models. Network maintenance and operations are simplified by avoiding the need for switches to be of the same model and avoiding disruption when upgrading. In some embodiments, the ASs 556-1, 556-2, 556-3, 556-4, 556-5, 556-6, 556-7, 556-8 of the AS ring 558 are connected to at least one DS. For example, any AS 556-1, 556-2, 556-3, 556-4, 556-5, 556-6, 556-7, or 556-8 can be connected to a DS. If a connection between a DS and one of the ASs 556-1, 556-2, 556-3, 556-4, 556-5, 556-6, 556-7, or 556-8 of the AS ring 558 is broken, another AS of the AS ring 558 can be connected to the DS by a technician or a lay person without expert networking troubleshooting skills. In some embodiments, each of the ASs 556-1, 556-2, 556-3, 556-4, 556-5, 556-6, 556-7, 556-8 of the AS ring 558 is connected to at least one wireless access point (AP).

Figure 6:
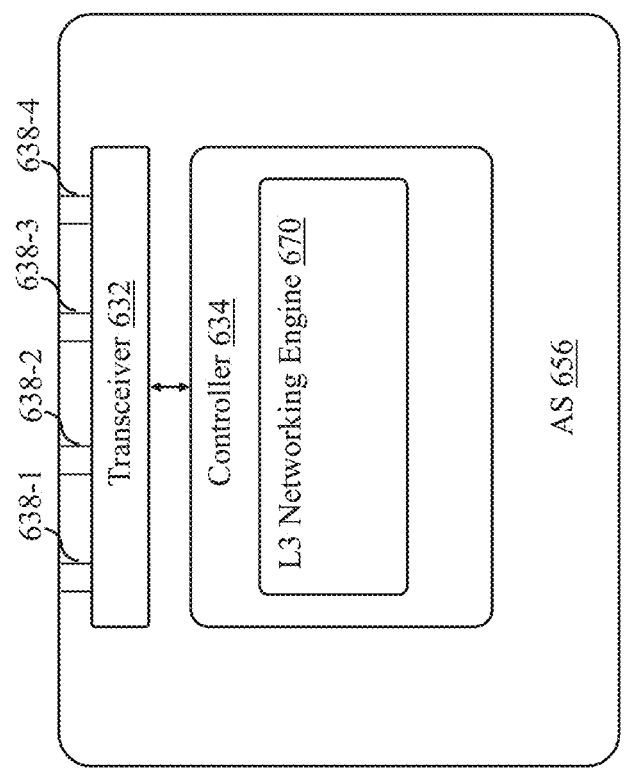
FIG. 6 depicts an embodiment of an AS of the AS ring depicted in FIG. 5.

FIG. 6 depicts an AS 656, which is an embodiment of the AS 556-1, 556-2, 556-3, 556-4, 556-5, 556-6, 556-7, or 556-8 of the AS ring 558 depicted in FIG. 5. The AS 656 may be an embodiment of the ASs 556-1, 556-2, 556-3, 556-4, 556-5, 556-6, 556-7, 556-8 depicted in FIG. 5. However, the ASs 556-1, 556-2, 556-3, 556-4, 556-5, 556-6, 556-7, 556-8 depicted in FIG. 5 are not limited to the embodiment depicted in FIG. 6. In the embodiment depicted in FIG. 6, the AS 656 includes at least one wireless and/or wired transceiver 632, four network ports 638-1, 638-2, 638-3, 638-4 operably connected to the transceiver 632, and a controller 634 operably connected to the transceiver 632. In some embodiments, the transceiver 632 includes a physical layer (PHY) device. The transceiver 632 may be any suitable type of transceiver. For example, the transceiver 632 may be a LAN (e.g., Ethernet) transceiver. In some embodiments, the AS 656 includes multiple transceivers. The network ports 638-1, 638-2, 638-3, 638-4 may be any suitable type of ports. For example, the network ports 638-1, 638-2, 638-3, 638-4 may be LAN network ports such as Ethernet ports. However, the network ports 638-1, 638-2, 638-3, 638-4 are not limited to LAN network ports. The network ports 638-1, 638-2, 638-3, 638-4 can be used to connected to corresponding network ports of peer ASs, one or more wireless APs, and/or one or more STAs. For example, the network ports 638-1, 638-2 are connected to network ports of peer ASs, while the network ports 638-3, 638-4 are connected to a wireless AP and a STA (e.g., a laptop computer, a desktop computer, or a mobile phone), two wireless APs, or two STAs. In some embodiments, the AS 656 includes different number of network ports. In some embodiments, the AS 656 includes one or more antennas. In some embodiments, the controller 634 is configured to control the transceiver 632 to process packets received through the network ports 638-1, 638-2, 638-3, 638-4 and/or to generate outgoing packets to be transmitted through the network ports 638-1, 638-2, 638-3, 638-4. In some embodiments, the controller 634 is configured to obtain and/or store network information relevant to the AS 656. For example, the controller 634 may be configured to obtain and/or store network information (e.g., routing information such as a routing table) relevant to the AS 556. In the embodiment depicted in FIG. 6, the AS 656 includes a Layer 3 (L3) network engine 670 configured to execute one or more Layer 3 (L3) protocols, for example, an Internal Gateway Protocol (IGP) (e.g., an Open Shortest Path First (OSPF) protocol), a Border Gateway Protocol (BGP), or an Intermediate System to Intermediate System (IS-IS) protocol. In some embodiments, the AS 656 includes a processor (e.g., a microcontroller, a DSP, and/or a CPU) configured to execute one or more Layer 3 (L3) protocols, and memory that may store information (e.g., an operation system (OS)) for the processor. In these embodiments, the controller 634 (e.g., the L3 network engine 670) is implemented using a processor and memory.

Figure 7:
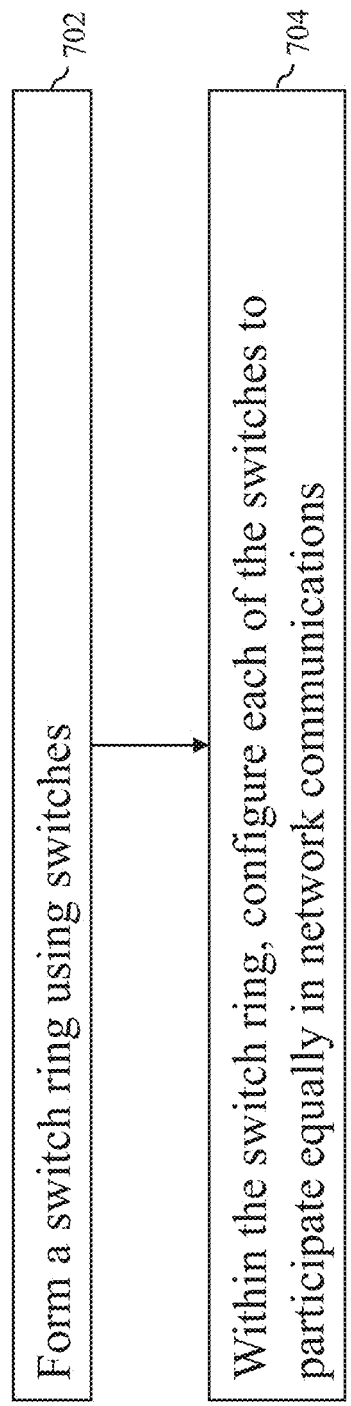
FIG. 7 is a process flow diagram of a method for switch management in accordance to an embodiment of the invention.

FIG. 7 is a process flow diagram of a method for switch management in accordance to an embodiment of the invention. According to the method, at block 702, a switch ring is formed using switches. At block 704, within the switch ring, each of the switches is configured to participate equally in network communications. A switch (e.g., an AS) in the switch ring may have a peer-to-peer relationship with other switches (e.g., ASs) in the switch ring. A switch (e.g., an AS) in the switch ring may perform the same or similar functions in the network protocol and routing as other switches (e.g., ASs) in the switch ring. A switch (e.g., an AS) in the switch ring may act as the same role in the network protocol and routing as other switches (e.g., ASs) in the switch ring. The switch ring may not differentiate between master switches and non-master switches. In some embodiments, each of the switches of the switch ring is independently managed using a cloud server. In some embodiments, within the switch ring, each of the switches is configured to participate equally in network routing. For example, within the switch ring, each switch performs Layer 3 (network layer) routing equally without specialized stacking protocols. Consequently, special roles, such as master switch and standby switches, are eliminated in the switch ring, and all the switches in the switch ring are equal in function and participate in the routing protocol exchange of information as required by at least one corresponding Layer 3 routing protocol (e.g., OSPF, BGP, and/or IS-IS protocol, etc.) used in the switch ring. In some embodiments, a failure within the switch ring is automatically detected based on a routing protocol executed by the switches of the switch ring, and in response to the failure, at least one alternative routing path is provided within the switch ring. In some embodiments, network ports of the switches that are capable of handling data traffic of at least one network layer (Layer 3) protocol are connected to each other. In some embodiments, the at least one network layer (Layer 3) protocol includes an Internal Gateway Protocol (IGP), a Border Gateway Protocol (BGP), or an Intermediate System to Intermediate System (IS-IS) protocol. In some embodiments, the at least one network layer protocol includes an Open Shortest Path First (OSPF) protocol. In some embodiments, the switches of the switch ring include access switches (ASs). In some embodiments, the access switches (ASs) are connected to at least one distribution switch (DS). In some embodiments, a switch is added to the switch ring without service disruption. In some embodiments, a switch is removed from the switch ring without service disruption. In some embodiments, the switches of the switch ring are of different types or models. In some embodiments, firmware of a switch of the switch ring is updated without rebooting of other switches of the switch ring. In some embodiments, each of the switches of the switch ring is connected to at least one wireless access point (AP). The switch ring may be similar to, the same as, or a component of the AS rings 358-1, 358-2 depicted in FIG. 3, the AS ring 458 depicted in FIG. 4, and/or the AS ring 558 depicted in FIG. 5. The switches may be similar to, the same as, or a component of the ASs 356-1, 356-2, 356-3, 356-4, 356-5, 356-6, 356-7, 356-8 depicted in FIG. 3, the ASs 456-1, 456-2, 456-4, 456-5, . . . , 456-M-2, 456-M-1, 456-M depicted in FIG. 4, the ASs 556-1, 556-2, 556-3, 556-4, 556-5, 556-6, 556-7, 556-8 depicted in FIG. 5, and/or the AS 656 depicted in FIG. 6. The network ports may be similar to, the same as, or a component of the network port 238 depicted in FIG. 2, the network ports 538-1, 538-2, 538-3, 538-4, 538-5, 538-6, 538-7, 538-8, 538-9, 538-10, 538-11, 538-12, 538-13, 538-14, 538-15, 538-16 depicted in FIG. 5, and/or the network ports 638-1, 638-2, 638-3, 638-4. The DS may be similar to, the same as, or a component of the DSs 352-1, 352-2 depicted in FIG. 3. The wireless AP may be similar to, the same as, or a component of the wireless APs 360-1, 360-2, 360-3, 360-4, 360-5, 360-6 depicted in FIG. 3. The cloud server may be similar to, the same as, or a component of the cloud server 102 depicted in FIG. 1.

Figure 8:
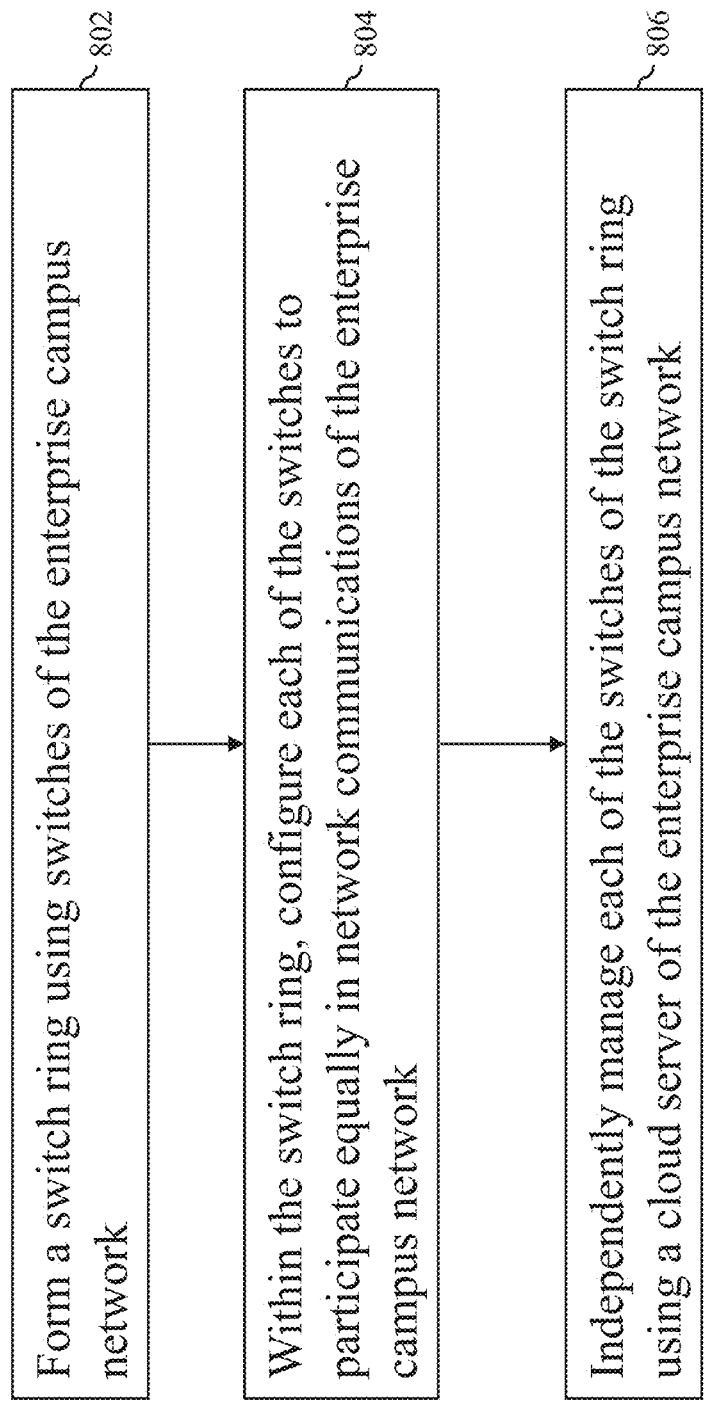
FIG. 8 is a process flow diagram of a method for switch management in an enterprise campus network in accordance to an embodiment of the invention.

FIG. 8 is a process flow diagram of a method for switch management in an enterprise campus network in accordance to an embodiment of the invention. According to the method, at block 802, a switch ring is formed using switches of the enterprise campus network. At block 804, within the switch ring, each of the switches is configured to participate equally in network communications of the enterprise campus network. At block 806, each of the switches of the switch ring is independently managed using a cloud server of the enterprise campus network. A switch (e.g., an AS) in the switch ring may have a peer-to-peer relationship with other switches (e.g., ASs) in the switch ring. A switch (e.g., an AS) in the switch ring may perform the same or similar functions in the network protocol and routing as other switches (e.g., ASs) in the switch ring. A switch (e.g., an AS) in the switch ring may act as the same role in the network protocol and routing as other switches (e.g., ASs) in the switch ring. The switch ring may not differentiate between master switches and non-master switches. In some embodiments, within the switch ring, each of the switches is configured to participate equally in network routing of the enterprise campus network. For example, within the switch ring, each switch performs Layer 3 (network layer) routing equally without specialized stacking protocols. Consequently, special roles, such as master switch and standby switches, are eliminated in the switch ring, and all the switches in the switch ring are equal in function and participate in the routing protocol exchange of information as required by at least one corresponding Layer 3 routing protocol (e.g., OSPF, BGP, and/or IS-IS protocol, etc.) used in the switch ring. In some embodiments, a failure within the switch ring is automatically detected based on a routing protocol executed by the switches of the switch ring, and in response to the failure, at least one alternative routing path is provided within the switch ring. In some embodiments, network ports of the switches that are capable of handling data traffic of at least one network layer protocol are connected to each other. In some embodiments, the at least one network layer protocol includes an IGP, a BGP, or an IS-IS protocol. In some embodiments, the at least one network layer protocol includes an OSPF protocol. In some embodiments, the switches of the switch ring include access switches (ASs). In some embodiments, the access switches (ASs) are connected to at least one distribution switch (DS). In some embodiments, a switch is added to the switch ring without service disruption. In some embodiments, a switch is removed from the switch ring without service disruption. In some embodiments, the switches of the switch ring are of different types or models. In some embodiments, firmware of a switch of the switch ring is updated without rebooting of other switches of the switch ring. In some embodiments, each of the switches of the switch ring is connected to at least one wireless access point (AP). The switch ring may be similar to, the same as, or a component of the AS rings 358-1, 358-2 depicted in FIG. 3, the AS ring 458 depicted in FIG. 4, and/or the AS ring 558 depicted in FIG. 5. The switches may be similar to, the same as, or a component of the ASs 356-1, 356-2, 356-3, 356-4, 356-5, 356-6, 356-7, 356-8 depicted in FIG. 3, the ASs 456-1, 456-2, 456-4, 456-5, ..., 456-M-2, 456-M-1, 456-M depicted in FIG. 4, the ASs 556-1, 556-2, 556-3, 556-4, 556-5, 556-6, 556-7, 556-8 depicted in FIG. 5, and/or the AS 656 depicted in FIG. 6. The network ports may be similar to, the same as, or a component of the network port 238 depicted in FIG. 2, the network ports 538-1, 538-2, 538-3, 538-4, 538-5, 538-6, 538-7, 538-8, 538-9, 538-10, 538-11, 538-12, 538-13, 538-14, 538-15, 538-16 depicted in FIG. 5, and/or the network ports 638-1, 638-2, 638-3, 638-4. The DS may be similar to, the same as, or a component of the DSs 352-1, 352-2 depicted in FIG. 3. The wireless AP may be similar to, the same as, or a component of the wireless APs 360-1, 360-2, 360-3, 360-4, 360-5, 360-6 depicted in FIG. 3. The cloud server may be similar to, the same as, or a component of the cloud server 102 depicted in FIG. 1. The enterprise campus network may be similar to, the same as, or a component of the network 150 depicted in FIG. 1, the network 350 depicted in FIG. 3, and/or the network 450 depicted in FIG. 4. The enterprise campus network may be deployed at a customer site, for example, the customer site 114 depicted in FIG. 1.

Figure 9:
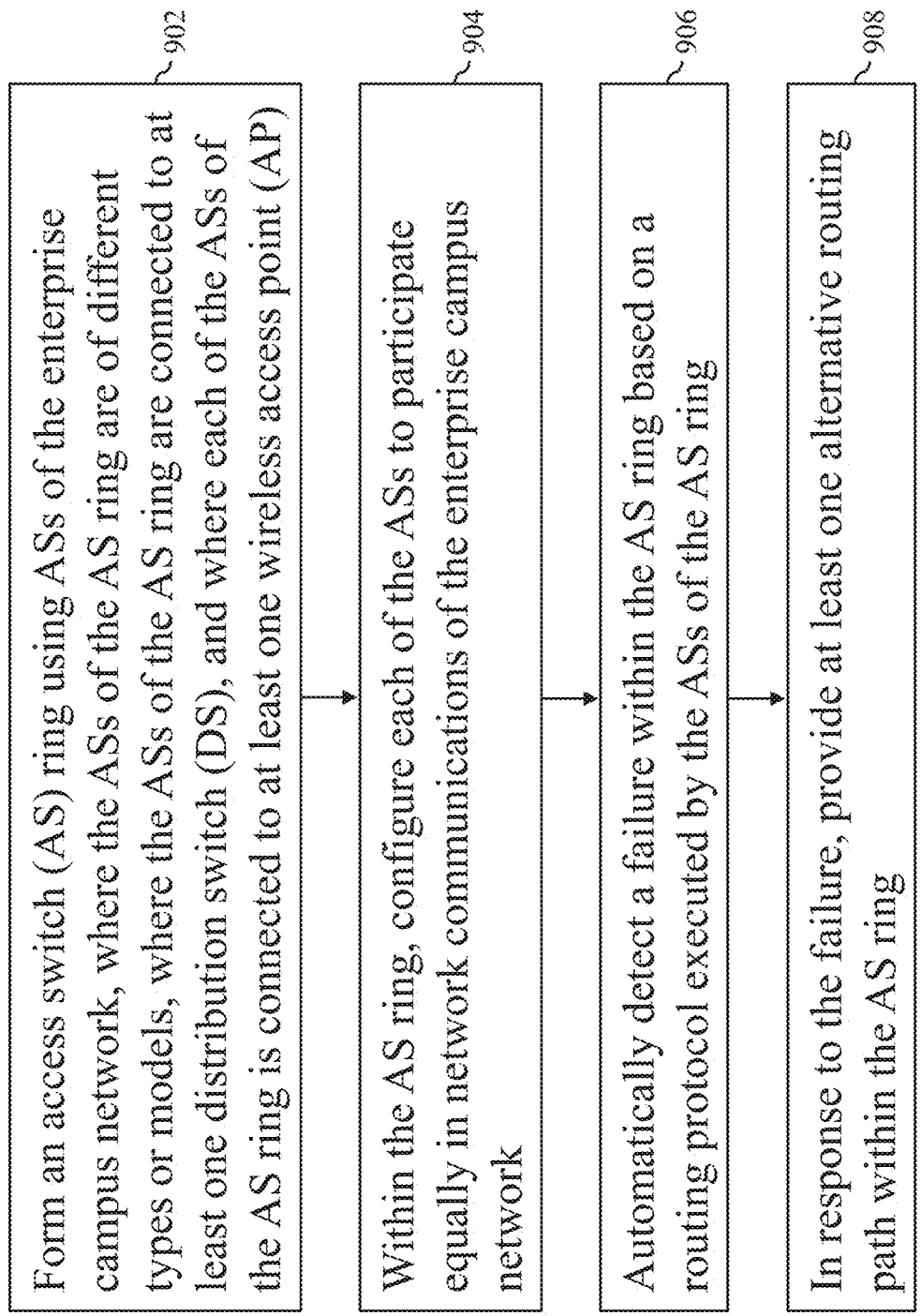
FIG. 9 is a process flow diagram of a method for switch management in an enterprise campus network in accordance to an embodiment of the invention.

FIG. 9 is a process flow diagram of a method for switch management in an enterprise campus network in accordance to an embodiment of the invention. According to the method, at block 902, an access switch (AS) ring is formed using ASs of the enterprise campus network, where the ASs of the AS ring are of different types or models, where the ASs of the AS ring are connected to at least one distribution switch (DS), and where each of the ASs of the AS ring is connected to at least one wireless access point (AP). At block 904, within the AS ring, each of the ASs is configured to participate equally in network routing of the enterprise campus network. For example, within the AS ring, each AS performs Layer 3 (network layer) routing equally without specialized stacking protocols. Consequently, special roles, such as master switch and standby switches, are eliminated in the AS ring, and all the ASs in the AS ring are equal in function and participate in the routing protocol exchange of information as required by at least one corresponding Layer 3 routing protocol (e.g., OSPF, BGP, IS-IS, etc.) used in the AS ring. At block 906, a failure within the AS ring is automatically detected based on a routing protocol executed by the ASs of the AS ring. At block 908, in response to the failure, at least one alternative routing path is provided within the AS ring. Each AS in the AS ring may have a peer-to-peer relationship with other ASs in the AS ring. Each AS in the AS ring may perform the same or similar functions in the network protocol and routing as other ASs in the AS ring. Each AS in the AS ring may act as the same role in the network protocol and routing as other ASs in the AS ring. The AS ring may not differentiate between master ASs and non-master ASs. In some embodiments, network ports of the ASs that are capable of handling data traffic of at least one network layer protocol are connected to each other. In some embodiments, the at least one network layer protocol includes an IGP, a BGP, or an IS-IS protocol. In some embodiments, the at least one network layer protocol includes an OSPF protocol. In some embodiments, an AS is added to the AS ring without service disruption. In some embodiments, an AS is removed from the AS ring without service disruption. In some embodiments, firmware of an AS of the AS ring is updated without rebooting of other ASs of the AS ring. The AS ring may be similar to, the same as, or a component of the AS rings 358-1, 358-2 depicted in FIG. 3, the AS ring 458 depicted in FIG. 4, and/or the AS ring 558 depicted in FIG. 5. The ASs may be similar to, the same as, or a component of the ASs 356-1, 356-2, 356-3, 356-4, 356-5, 356-6, 356-7, 356-8 depicted in FIG. 3, the ASs 456-1, 456-2, 456-4, 456-5, ..., 456-M-2, 456-M-1, 456-M depicted in FIG. 4, the ASs 556-1, 556-2, 556-3, 556-4, 556-5, 556-6, 556-7, 556-8 depicted in FIG. 5, and/or the AS 656 depicted in FIG. 6. The network ports may be similar to, the same as, or a component of the network port 238 depicted in FIG. 2, the network ports 538-1, 538-2, 538-3, 538-4, 538-5, 538-6, 538-7, 538-8, 538-9, 538-10, 538-11, 538-12, 538-13, 538-14, 538-15, 538-16 depicted in FIG. 5, and/or the network ports 638-1, 638-2, 638-3, 638-4. The DS may be similar to, the same as, or a component of the DSs 352-1, 352-2 depicted in FIG. 3. The wireless AP may be similar to, the same as, or a component of the wireless APs 360-1, 360-2, 360-3, 360-4, 360-5, 360-6 depicted in FIG. 3. The cloud server may be similar to, the same as, or a component of the cloud server 102 depicted in FIG. 1. The enterprise campus network may be similar to, the same as, or a component of the network 150 depicted in FIG. 1, the network 350 depicted in FIG. 3, and/or the network 450 depicted in FIG. 4. The enterprise campus network may be deployed at a customer site, for example, the customer site 114 depicted in FIG. 1.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for switch management, the method comprising:
   forming a switch ring using a plurality of switches, wherein forming the switch ring using the switches comprises connecting a plurality of standard network ports of the switches for handling data traffic of at least one network layer protocol to each other without using a plurality of stack ports;
   within the switch ring, configuring each of the switches to participate equally in network communications, wherein a first switch in the switch ring performs same functions in a network protocol and routing as a second switch in the switch ring; and
   independently managing each of the switches of the switch ring using a cloud server.

2. The method of claim 1, wherein within the switch ring, configuring each of the switches to participate equally in the network communications comprises within the switch ring, configuring each of the switches to participate equally in network routing.

3. The method of claim 1, further comprising:
   automatically detecting a failure within the switch ring based on a routing protocol executed by the switches of the switch ring; and
   in response to the failure, providing at least one alternative routing path within the switch ring.

4. The method of claim 1, wherein the at least one network layer protocol comprises an Internal Gateway Protocol (IGP), a Border Gateway Protocol (BGP), or an Intermediate System to Intermediate System (IS-IS) protocol.

5. The method of claim 1, wherein the at least one network layer protocol comprises an Open Shortest Path First (OSPF) protocol.

6. The method of claim 1, wherein the switches of the switch ring comprise a plurality of access switches (ASs).

7. The method of claim 6, wherein the access switches (as) are connected to at least one distribution switch (DS).

8. The method of claim 1, further comprising adding a switch to the switch ring without service disruption.

9. The method of claim 1, further comprising removing a switch from the switch ring without service disruption.

10. The method of claim 1, wherein the switches of the switch ring are of different types or models.

11. The method of claim 1, further comprising updating firmware of a switch of the switch ring without rebooting of other switches of the switch ring.

12. The method of claim 1, wherein each of the switches of the switch ring is connected to at least one wireless access point (AP).

13. A method for switch management in an enterprise campus network, the method comprising:
   forming a switch ring using a plurality of switches of the enterprise campus network, wherein forming the switch ring comprises connecting a plurality of standard network ports of the switches for handling data traffic of at least one network layer protocol to each other without using a plurality of stack ports;
   within the switch ring, configuring each of the switches to participate equally in network communications of the enterprise campus network, wherein a first switch in the switch ring performs same functions in a network protocol and routing as a second switch in the switch ring; and
   independently managing each of the switches of the switch ring using a cloud server of the enterprise campus network.

14. The method of claim 13, wherein within the switch ring, configuring each of the switches to participate equally in the network communications comprises within the switch ring, configuring each of the switches to participate equally in network routing of the enterprise campus network.

15. The method of claim 14, further comprising:
   automatically detecting a failure within the switch ring based on a routing protocol executed by the switches of the switch ring; and
   in response to the failure, providing at least one alternative routing path within the switch ring.

16. The method of claimer 13, wherein the at least one network layer protocol comprises an Internal Gateway Protocol (IGP), a Border Gateway Protocol (BGP), or an Intermediate System to Intermediate System (IS-IS) protocol.

17. A method for switch management in an enterprise campus network, the method comprising:
   forming an access switch (AS) ring using a plurality of ASs of the enterprise campus network, wherein the ASs of the AS ring are of different types or models, wherein the ASs of the AS ring are connected to at least one distribution switch (DS), and wherein each of the ASs of the AS ring is connected to at least one wireless access point (AP), wherein forming the AS ring comprises connecting a plurality of standard network ports of the ASs for handling data traffic of at least one network layer protocol to each other without using a plurality of stack ports;

within the AS ring, configuring each of the ASs to participate equally in network routing of the enterprise campus network, wherein a first AS in the AS ring performs same functions in a network protocol and routing as a second AS in the AS ring;

automatically detecting a failure within the AS ring based on a routing protocol executed by the ASs of the AS ring;

in response to the failure, providing at least one alternative routing path within the AS ring; and independently managing each of the ASs of the AS ring using a cloud server.

* * * * *